US008015280B2

United States Patent
Saha et al.

(10) Patent No.: US 8,015,280 B2
(45) Date of Patent: *Sep. 6, 2011

(54) METHOD AND SYSTEM FOR INTELLIGENT FEATURE DEGRADATION IN RESPONSE TO A NETWORK DEFICIENCY DETECTION

(75) Inventors: Debashis Saha, Sunnyvale, CA (US);
Tim Kimmet, San Jose, CA (US);
Sangjin Lee, San Jose, CA (US);
Armond Bigian, San Jose, CA (US);
Rami El-Charif, San Jose, CA (US)

(73) Assignee: eBay Inc., San Jose, CA (US)

( * ) Notice: Subject to any disclaimer, the term of this patent is extended or adjusted under 35 U.S.C. 154(b) by 940 days.

This patent is subject to a terminal disclaimer.

(21) Appl. No.: 11/865,220

(22) Filed: Oct. 1, 2007

(65) Prior Publication Data
US 2009/0089699 A1    Apr. 2, 2009

(51) Int. Cl.
*G06F 15/173* (2006.01)
(52) U.S. Cl. .................. 709/224; 709/223; 709/226
(58) Field of Classification Search .......... 709/223–224, 709/226, 229
See application file for complete search history.

(56) References Cited

U.S. PATENT DOCUMENTS

| | | | |
|---|---|---|---|
| 6,240,068 B1 * | 5/2001 | Dawes | 709/224 |
| 6,842,775 B1 * | 1/2005 | Chastain et al. | 709/207 |
| 7,313,407 B2 * | 12/2007 | Shapira | 455/512 |
| 2002/0012011 A1 * | 1/2002 | Roytman et al. | 709/224 |
| 2005/0193110 A1 * | 9/2005 | Dantzig et al. | 709/224 |
| 2006/0129694 A1 * | 6/2006 | Ishida et al. | 709/238 |
| 2006/0146878 A1 * | 7/2006 | Srivastava | 370/469 |
| 2006/0184662 A1 * | 8/2006 | Rivierre et al. | 709/224 |
| 2006/0239271 A1 * | 10/2006 | Khasnabish et al. | 370/395.21 |
| 2007/0067440 A1 * | 3/2007 | Bhogal et al. | 709/224 |
| 2007/0094381 A1 * | 4/2007 | Weiss et al. | 709/224 |
| 2008/0049640 A1 * | 2/2008 | Heinz et al. | 370/252 |
| 2008/0081624 A1 * | 4/2008 | Reial et al. | 455/436 |
| 2009/0122748 A1 * | 5/2009 | Gourhant et al. | 370/328 |

* cited by examiner

*Primary Examiner* — Philip B Tran
(74) *Attorney, Agent, or Firm* — Schwegman, Lundberg & Woessner, P.A.

(57) ABSTRACT

A system for intelligent feature degradation in response to a network deficiency detection, in one example embodiment, comprises a monitoring module to monitor a utilization of a plurality of network resources, a processing module to determine whether the utilization of the plurality of the network resources is above a threshold, to determine a category of an application level using entity, and to determine a revenue generated by the application level using entity, and a degrading module to degrade at least one application level functionality available to the using entity based on the category and the revenue generated by the application level using entity unless the utilization of the plurality of the network resources drops below the first threshold.

20 Claims, 10 Drawing Sheets

METHOD AND SYSTEM FOR INTELLIGENT FEATURE DEGRADATION IN RESPONSE TO A NETWORK DEFICIENCY DETECTION

TECHNICAL FIELD

This disclosure relates to communications over a distributed network system.

BACKGROUND

Some of the issues of distributed network systems include spikes in the network traffic that may be predictably caused by a planned event. A predictable situation may involve a free service day. Other network traffic issues may be less predictable and caused by a failure of one of the network components. A traffic deficiency may originate anywhere within the distributed network. Common solutions to a network deficiency involve observing traffic and network characteristics at the network level. Such observation may be a lagging indicator of a network deficiency.

Once a network deficiency is discovered, common solutions to stabilize the system involve drastic measures, including randomly cutting client access until the issue is resolved. Determining the points and levels of the degradation of network capacity, doing an analysis to be able to predict future situations and how to deal with them is a substantial deficiency in the distributed network systems.

BRIEF DESCRIPTION OF DRAWINGS

Embodiments of the present technology are illustrated by way of example in the figures of the accompanying drawings, in which similar reference numbers indicate similar elements and in which.

DETAILED DESCRIPTION

The embodiments described herein may be implemented in an operating environment comprising software installed on a computer, hardware, or a combination of software and hardware.

Some of the issues of distributed network systems may include spikes in the network traffic that are predictably caused by a planned event. A predictable situation may involve the network traffic spikes that occur on a "free service day". Other network traffic issues may be less predictable and caused by a failure of one of the network components. A network deficiency may originate anywhere within the distributed network. Observing traffic and network characteristics at the network level may be a lagging indicator of a network deficiency. Once a network traffic issue is discovered by observing the traffic and network characteristics, stabilizing the system may involve cutting client access until the issue is resolved. Described herein is a method and system for determining the degradation of network capacity, predicting future situations and dealing with them.

Figure 1:
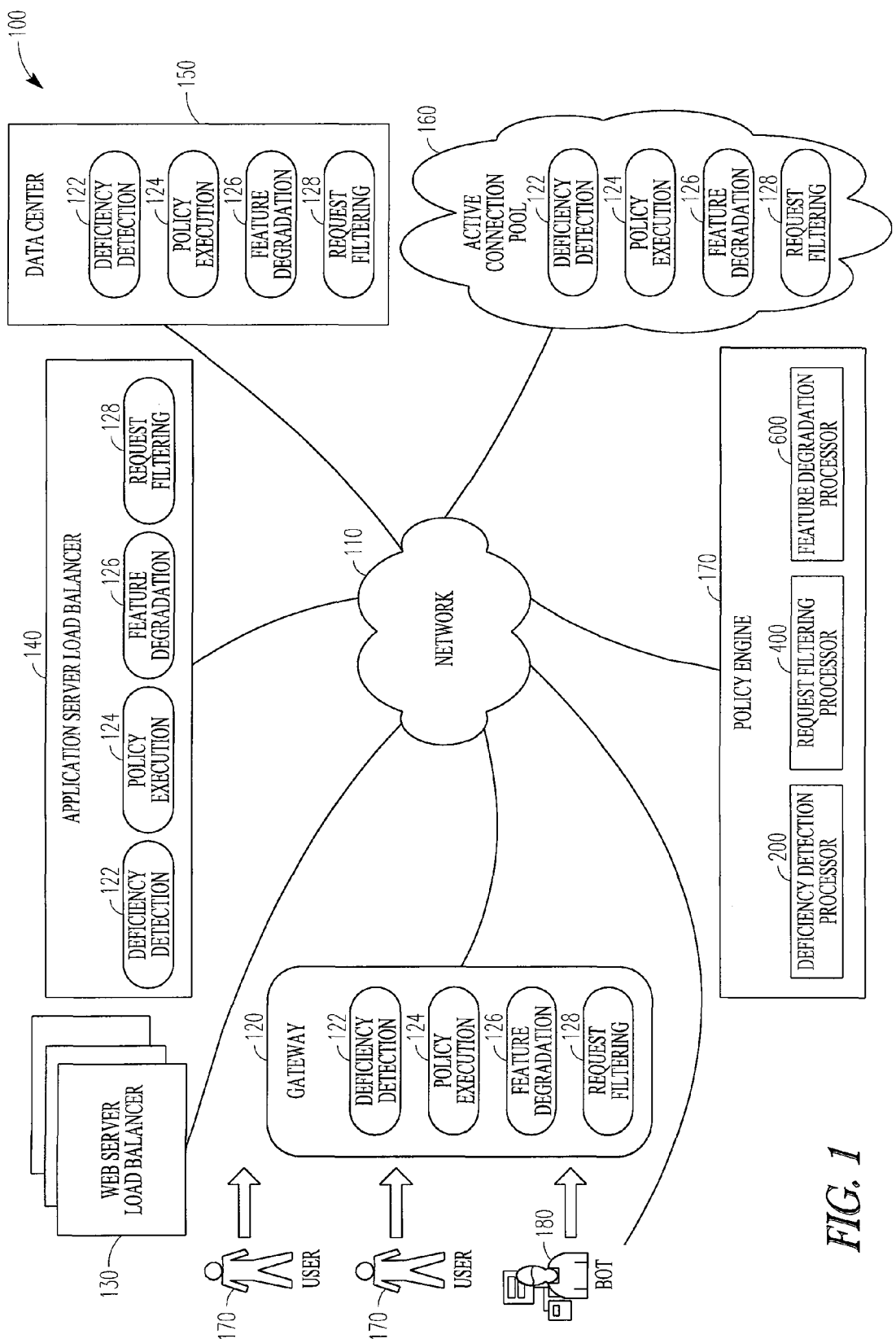
FIG. 1 is a diagrammatic representation of a network environment within which example embodiments may be implemented.

FIG. 1 shows a sample network environment 100, within which methods and systems are described to detect a network deficiency, for intelligent request filtering in response to a network deficiency, and for intelligent feature degradation in response to a network deficiency. The methods and systems may be implemented in accordance with the example embodiment. As shown in FIG. 1, the sample network environment 100 may comprise a network 110, a gateway 120, a web server load balancer 130, an application server load balancer 140, a data center 150, an active connections pool 160, and a policy engine 170. In some embodiments, the active connections pool 160 is optional or may be represented by metrics collected at the web server load balancer 130 and the application server load balancer 140. The gateway 120, the application server load balancer 140, the data center 150 and the active connections pool 160 may include a deficiency detection module 122, a policy execution module 124, a feature degradation module 126, and a request filtering module 128. The policy engine 170 may include a deficiency detection processor 200, a request filtering processor 400, and a feature degradation processor 600. The network 110 may be a network of data processing nodes that are interconnected for the purpose of data communication.

The illustrated web server load balancer 130 and the application server load balancer 140 (e.g. F5, NetScaler, or Cisco) are not limited to any specific type. The web server load balancer 130 and the application server load balancer 140 may be utilized to spread work between many servers in order to horizontally scale the application and provide redundancy for failover. The web server load balancer 130 and the application server load balancer 140 may be utilized to increase capacity of a plurality of servers. The web server load balancer 130 and the application server load balancer 140 may include a virtual server which, in turn, includes an IP (Internet Protocol) address and port. The virtual server may be bound to a number of physical services running on physical servers in a server farm. A physical server may contain the physical server's IP address and port. As an example, a service request may be sent to the virtual server using the virtual server IP address, which in turn selects a physical server in a server farm and directs this request to the selected physical server.

When a service request is placed at the application tier, the service request may go through initial firewalls and routers before getting into the sample network environment 100. The service request may pass through the web server load balancer 130 and the application server load balancer 140, where the request may be directed according to a category of the request. The sample network environment 100 may be distributed throughout multiple geographically remote facilities. It will be appreciated that the gateway 120, the web server load balancer 130, and the application server load balancer 140 may not be included in the sample embodiments of the systems described herein because the sample network environment 100 is merely a sample implementation and the systems described herein are not technology-specific.

In an example embodiment, the gateway 120 may be a network point that acts as an entrance to the sample network environment 100. In the sample network environment 100, a computer server acting as a gateway 120 may also be acting as a proxy server and a firewall server. The gateway 120 may be associated with both a router, which knows where to direct a given packet of data that arrives at the gateway 120, and a switch, which may furnish the actual path in and out of the gateway for a given packet.

In an example embodiment, the web server load balancer 130 may be used to increase the capacity of a server farm beyond that of a single server. It may also allow the service to continue even in the face of server down time due to server failure or server maintenance. As mentioned above, the application server load balancer 140 may include a virtual server which, in turn, may include an IP address and port. This virtual server may be bound to a number of physical services running on the physical servers in a server farm. These physical services may contain the physical server's IP address and port. When a request is sent to the virtual server, the virtual server in turn selects a physical server in the server farm and directs this request to the selected physical server. Accordingly, a role played by the application server load balancer 140 is managing connections between clients and servers. Different virtual servers may be configured for different sets of physical services, such as Transmission Control Protocol (TCP) and User Datagram Protocol (UDP) services in general. Protocol or application-specific virtual servers that may be supported include Hyper Text Transfer Protocol (HTTP), File Transfer Protocol (FTP), SSL, SSL BRIDGE, SSL TCP, NNTP, Session Initiation Protocol (SIP), and Domain Name System (DNS). The load balancing methods may manage the selection of an appropriate physical server in a server farm. The application server load balancer 140 may also perform server monitoring of services in a web server farm. In case of failure of a service, the application server load balancer 140 may continue to perform load balancing across the remaining services. In case of failure of the servers bound to a virtual server, requests may be sent to a backup virtual server, if configured, or optionally redirected to a configured Uniform Resource Locator (URL).

In some example embodiments, the data center 150 may be a facility utilized for housing electronic equipment, typically computers and communications equipment. The computers and the communication equipment may be used for the purpose of handling the data of the data center 150. One of the purposes of the data center 150 may be to run the applications that may handle business and operational data. The data center 150 may be proprietary and developed internally, or bought from enterprise software vendors. Components of the data center 150 may include databases, file servers, application servers, and middleware. The data center 150 may also be used for offsite backups. A list of enabled filters as determined by the request filtering processor 400 may be maintained in a database of the data center 150 and applied against specific URLs and available URLs.

In some example embodiments, the active connections pool 160 may be a number of threads that are created to perform a number of tasks, usually organized in a queue. As soon as a thread completes its task, it may request the next task from the queue, and so forth. The thread may then terminate, or sleep, until there are new tasks available. The number of threads used is a parameter that can be altered to provide the best performance. The cost of having a larger thread pool may be an increased resource usage. Too many threads in the active connections pool 160 may waste resources utilized in creating the unused threads, destroying too many created threads, and spending more time later creating the threads again. On the contrary, creating threads too slowly may result in poor performance and may starve other processes of resources. With reference to the active connections pool 160, there may be a finite number of threads available per the active connections pool 160. A thread pool may be used instead of creating a new thread for each task to improve performance and system stability.

In some example embodiments, the policy engine 170 may comprise the deficiency detection processor 200, the request filtering processor 400, and the feature degradation processor 600. Each of the processors may be responsible for its corresponding area of a network deficiency detection, policy determination, and its enforcement. It will be appreciated that the roles of the processors described herein are closely related and may be supplemental or redundant.

In some example embodiments, the deficiency detection module 122 may gather information and report to the deficiency detection processor 200. The deficiency detection module 122 may not utilize agents placed throughout various components of the sample network environment 100. In some embodiments the deficiency detection module 122 may be completely agentless. The deficiency detection module 122 may include a network component to collect resource metrics that are made available to be queried by the deficiency detection processor 200. In some example embodiments, the policy execution module 124 may implement the overall policy as determined by the policy engine 170 and is located throughout the network components and tiers, including gateway 120, application server load balancer 140, data center 150, and the active connections pool 160. The policy execution module 124 may enforce the feature degradation and the request filtering policies to various degrees as determined by the feature degradation processor 600 and the deficiency detection processor 200. In some example embodiments, the feature degradation module 126 may implement the feature degradation policy and is located throughout the network components and tiers, including gateway 120, application server load balancer 140, data center 150, and the active connections pool 160. The feature degradation module 126 may enforce the feature degradation policy to various degrees as determined by the feature degradation processor 600.

In some example embodiments, the request filtering module 128 may implement the request filtering policy and is located throughout the network resources and tiers, including gateway 120, application server load balancer 140, data center 150, and the active connections pool 160. The request filtering module 128 may enforce the request filtering policy to various degrees as determined by the request filtering processor 400.

In some example embodiments, the deficiency detection processor 200 may detect a network deficiency by gathering the utilization metrics collected by the deficiency detection module 122 at the network resource level. Upon collection of the utilization metrics, the deficiency detection processor 200 analyzes the utilization metrics and makes a determination as to whether or not there is an indication of a precursor to a network deficiency. The determination is based upon the utilization metrics of the network resources. As an example, increasingly high memory utilization may indicate an imminent deterioration in the network traffic.

In some example embodiments, the request filtering processor 400 may determine the request filtering policy from the utilization metrics received and analyzed by the deficiency detection processor 200. The policy enforcement implemented by the request filtering processor 400 may be implemented in conjunction with the feature degradation policy implemented by the feature degradation processor 600. As the enforcement policy is being implemented, feedback from the deficiency detection module 122 is processed and analyzed by the deficiency detection processor 200 and passed on to the request filtering processor 400 to be considered in its further policy enforcement.

In some example embodiments, the feature degradation processor 600 may determine the feature degradation policy from the utilization metrics received and analyzed by the deficiency detection processor 200. The policy enforcement implemented by the feature degradation processor may be implemented in conjunction with the request filtering processor 400. As the enforcement policy is being implemented, feedback from the deficiency detection module 122 is processed and analyzed by the deficiency detection processor 200 and passed on to the feature degradation processor 600 to be considered in its further policy enforcement. A system to detect a network deficiency is described by a way of example with reference to FIG. 2.

Figure 2:
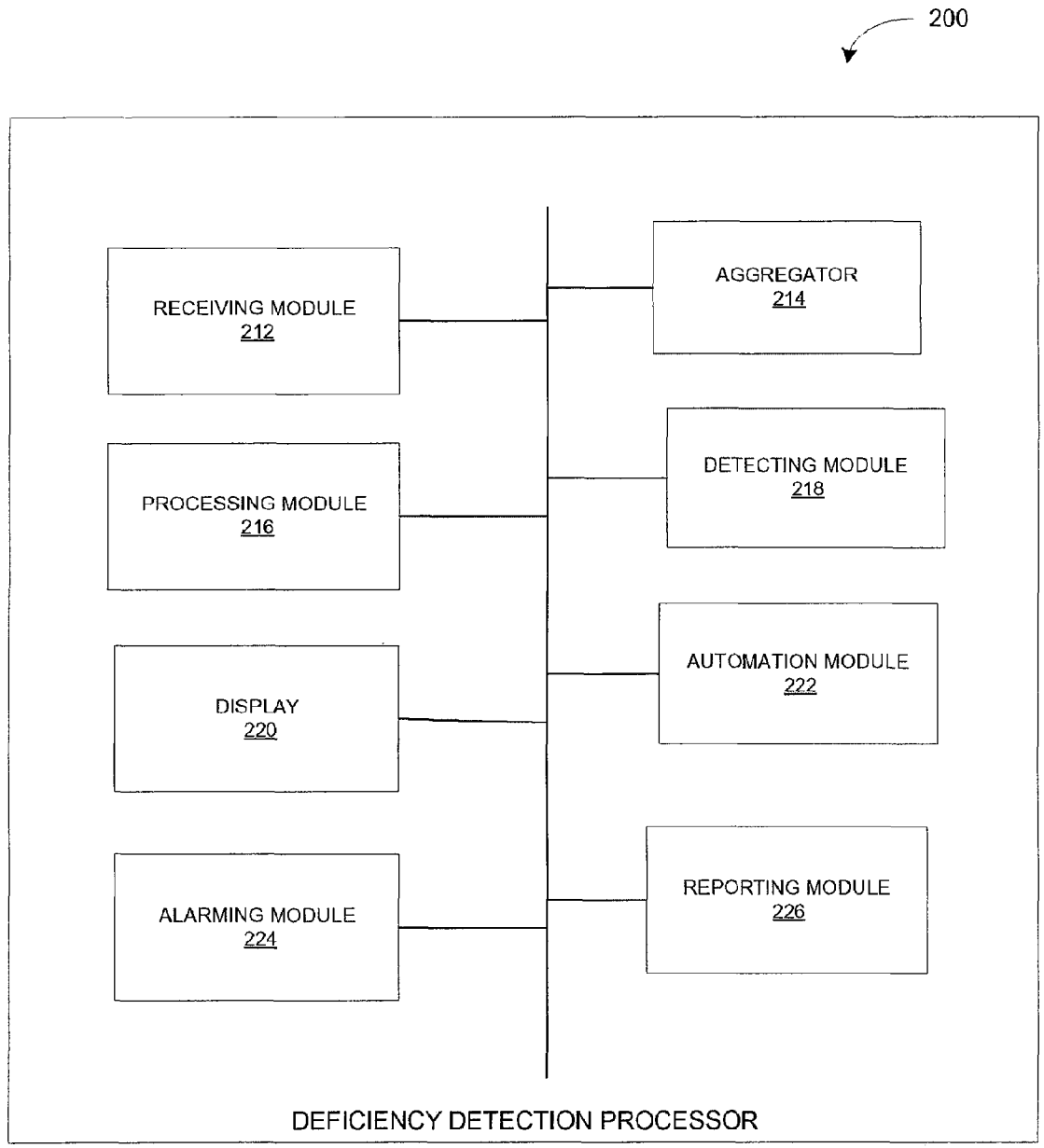
FIG. 2 is a block diagram of a system to detect a network deficiency, in accordance with an example embodiment.

Referring to FIG. 2 of the drawings, the deficiency detection processor 200 is shown to include several components that may be configured to perform various operations. The deficiency detection processor 200 may comprise a receiving module 212, an aggregator 214, a processing module 216, a detecting module 218, a display 220, an automation module 222, an alarming module 224, and a reporting module 226.

The receiving module 212, in an example embodiment, may be configured to receive information gathered by the deficiency detection module 122 about component utilization at the service level and made available at the network component level. The information received may comprise utilization metrics of performance of various network resources such CPU utilization, thread utilization, and memory consumption.

The aggregator 214, in an example embodiment, may be configured to aggregate the utilization metrics received from a network resource by the receiving module 212 with the utilization metrics received from the network resources homogeneous to the network resource. The aggregation may be performed to allow an analysis to be performed with respect to the aggregated utilization metrics to determine the overall policy.

The processing module 216, in an example embodiment, may be configured to determine whether or not there is a precursor indicative of a deterioration of the network traffic based on the analysis of the aggregated utilization metrics received by the receiving module 212 and aggregated by the aggregating module 214. If the processing module 216 determines that the aggregated utilization metrics of the network resources exceed a predetermined threshold, the detecting module 218 may be alerted. The detecting module 218, in an example embodiment, may be configured to detect the precursor indicative of deterioration in the network traffic based on the utilization metrics received by the receiving module 212 and the alert issued by the processing module 216.

The display 220, in some example embodiments, may be configured to display the utilization metrics received and aggregated on a Graphical User Interface (GUI) and to allow the operator to implement enforcement policies to alleviate network deficiency based on the determination made by the processing module 216. The display may be used both for monitoring of the situation and for the control of parameters set for the policy enforcement. Various uses of the GUI are discussed in more detail below.

The automation module 222, in some example embodiments, may be configured to automate the process of gathering the utilization metrics and policy enforcement. Using the automation module 222, the system to detect a network deficiency 200 may determine whether or not a precursor for a network deficiency is detected and what actions may be taken to implement various policies in response to the detection. In some embodiments, transaction logging may facilitate data collection for the automation and fine tuning and support the enforcement of the request filtering and feature degradation policies if sudden spikes in traffic cause the application server-tier performance to deteriorate. In some embodiments, the automation module 222 may be utilized to control a planned event that causes a spike in the network traffic of an e-commerce website (e.g. a "free listings" day, or the holiday season) The automation module 222 may be provided to detect a precursor event to a lost capacity situation, to reduce resource consumption, and to avoid meltdown through selection and reduction of incoming traffic by partial or total shutdown, wherein the partial shutdown is implemented through the feature degradation and the complete shutdown is implemented through the request filtering.

The reporting module 226, in an example embodiment, may be configured to report a determination made by processing module 216 as to whether a predetermined threshold of network resource utilization was made and a precursor to a network deterioration was detected by the detecting module 218. A report may be made to the policy engine 170, the request filtering processor 400, or the feature degradation processor 600. Various operations performed by the system to detect a network deficiency 200 are described by way of example with reference to an example method 300 of FIG. 3.

Figure 3:
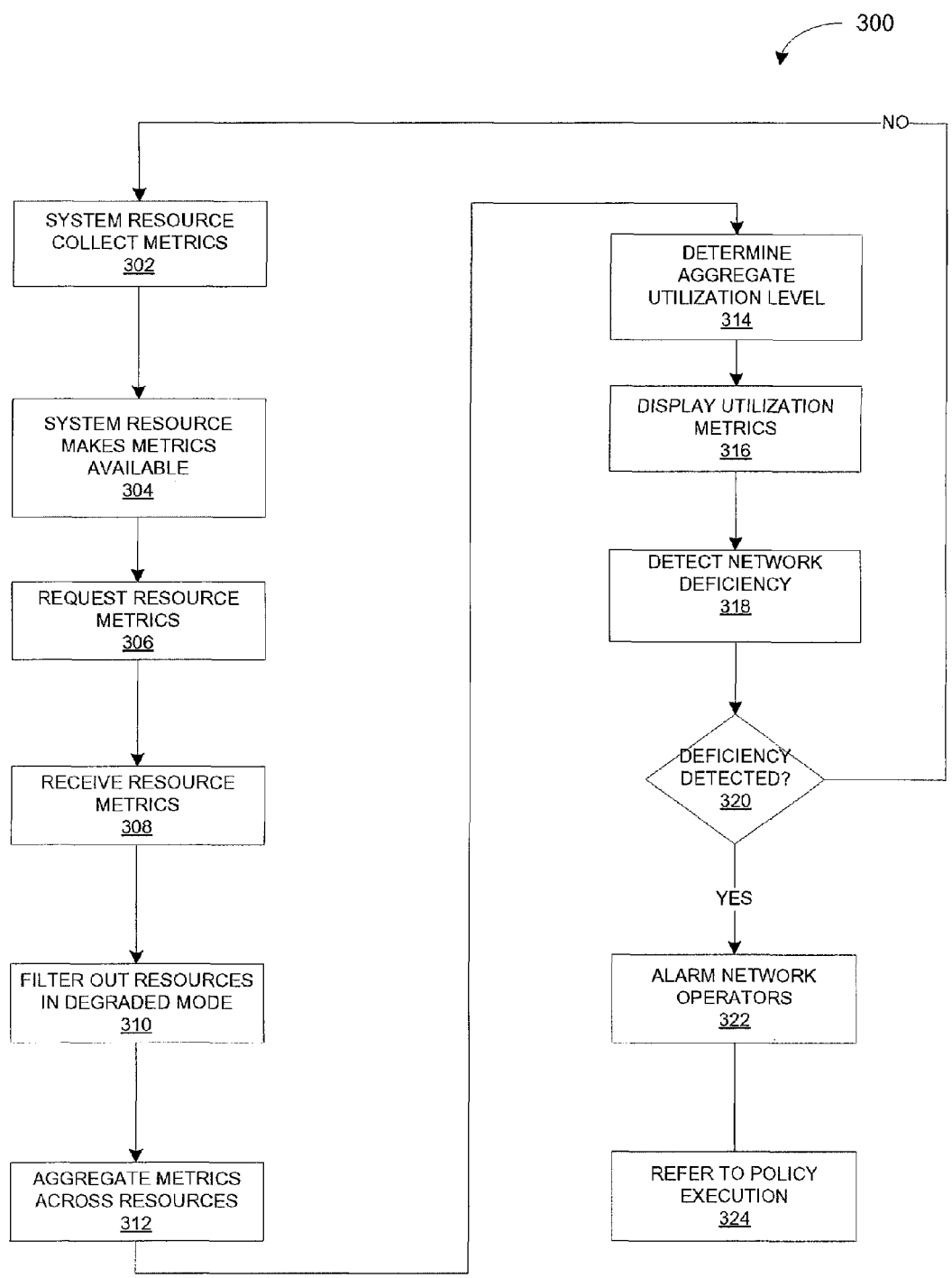
FIG. 3 is a flow chart illustrating a method to detect a network deficiency, in accordance with an example embodiment.

FIG. 3 is a flow chart illustrating a method 300 to detect a network deficiency, according to one example embodiment. The method 300 may be performed by processing logic that may comprise hardware (e.g. dedicated logic, programmable logic, microcode, etc.), software (such as run on a general purpose computer system or a dedicated machine), or a combination of both. In one example embodiment, the processing logic resides at the system to detect a network deficiency 200 illustrated in FIG. 2. The method 300 may be performed by the various modules discussed above with reference to FIG. 2. These modules may comprise processing logic.

As shown in FIG. 3, the method 300 commences with a deficiency detection module 122 collecting the utilization metrics at operation 302. The method 300 to detect network deficiency may be used to monitor utilization of network resources. By monitoring utilization of the network resources, the method 300 to detect network deficiency may predict what is going to happen to the network traffic even before there is a detectible deterioration in the network traffic, with no user input required. Additionally, an aggregate of the utilization metrics from many different points in the network may be utilized to analyze a network deficiency in the macro context. Thus, the method 300 to detect a network deficiency may utilize an ability of the network resources to collect the utilization metrics and make the information available to a service collecting the information and sending it to be analyzed by the system to detect a network deficiency 200.

A correlated matrix of the point where the utilization metrics are collected at the servers allows the detection on multiple levels of a network deficiency. Accordingly, enforcement of the policies may also be performed on multiple levels. The utilization metrics may be collected at load balancers such as web server load balancer 130 and application server load balancer 140, application servers, and data centers such as data center 150. Auto-learning may be utilized and the entire utilization metrics gathering and policy enforcement automated. The utilization metrics are gathered for the purpose of their analysis and to determine whether or not a referral to the request filtering processor 400 and the feature degradation processor 600 is warranted.

The policy enforcement may depend on a particular scenario. In some scenarios, the request filtering may be utilized a set of users (the same set of users are blocked consistently) may be blocked; in other scenarios the feature degradation module 126 may turn off some features. In yet other scenarios, both request filtering and feature degradation may be combined. The methods and systems may utilize network deficiency detection and policy execution across various nodes, from a web server to a load balancer to a proxy server to an application server. Depending on the level of the network deficiency, multiple tiers of enforcement may be utilized in intelligent modules, making policy determinations based on the anticipated traffic.

The method 300 to detect a network deficiency may leverage the utilization metrics collected from the network resources in multiple areas. The utilization metrics may be informative of a number of connections utilized and a number of maximum connections. The utilization metrics may be used to determine when the active connections will reach their maximum value, which is indicative of a network deficiency. In some embodiments, the maximum number of the connections by itself may not manifest a network deficiency; therefore, the load balancers may be looked at to ascertain whether there are more requests than there are connections to process the requests. If the connections start increasing on the load balancer, this may indicate that the outer servers are overloaded with the requests and the load balancer may not keep up. When this situation occurs, some users may not be able to connect to the server.

At operation 304, the utilization metrics are made available and gathered by the network deficiency detection module 122. In the example method 300, the server may send a request to a network resource to make the utilization metrics available. The utilization metrics made available at the network resource level may include CPU utilization, thread utilization, and memory exhaustion. The thread utilization made available by the network resource may include computing the percentage of the threads utilized. The system to detect a network deficiency 200 may monitor the network resources that may have direct impact on the network traffic in the future. The system to detect a network deficiency 200 may also collect the utilization metrics information at the network resources themselves, including CPU and memory utilization. By collecting the utilization metrics, The system to detect a network deficiency 200 may get an understanding of how the back end servers are performing and apply predetermined formulas to decide whether a network resource is near its maximum capacity. Accordingly, a response may be generated to an anticipated network deficiency. Thus system to detect a network deficiency 200 may monitor the application transactions at the network resource level and may not monitor the network traffic for the purposes of detecting a network deficiency.

At operation 306, the deficiency detection processor 200 may request the utilization metrics by querying the deficiency detection module 122. The information collected at the network resources may comprise CPU utilization, and it may be determined, for example, that the CPU utilization is reaching 80% or 90%. Even though the latency in the network traffic has not built yet, the situation may be a precursor to imminent network traffic deterioration. The network resources analyzed to determine whether or not there is an indication of precursor to a network deficiency may comprise CPU utilization, average memory usage, and thread usage.

At operation 308, the deficiency detection processor 200 may receive the utilization metrics via the receiving module 212. In some embodiments, the utilization metrics received may allow intelligent decisions based on the speed of the URLs and the speed at which a data center can process information. A cost determination may be based on the analysis of data associated with data centers. Thus, the detection may occur on many tiers, such as load balancer, application server, and data centers. The cost determination may be based on the collected utilization metrics. A UI (User Interface) may be utilized to support an enablement and a disablement of any action with respect to the utilization metrics received at operation 308. When either or both request filtering and feature degradation policies are enforced, further UI monitoring of the resource consumption may be utilized. The UI, in some embodiments, may be able to display effectively the state of the resource consumption after the enforcement of either or both policies.

In some embodiments, an operator of the policy engine 170 may enable blocking of the BOT 180 (web robot, a software application that runs automated tasks over the Internet) using the UI policy enablement control. The UI can be used to block BOTs at any level (Web Load Balancer 130, Application Server Load Balancer 140, Active Connections Pool on the Application Server 160, and Data Center 150) The BOT may be blocked by specifying its name, or by specifying a name of a group of BOTS. In some example embodiments, action in a single data center or across data centers may be blocked for a target pool of active connections. The set of actions available for enablement using the UI may be dynamic and pool-specific. The set of actions of actions may also be Data Center specific. For example, actions specified in one pool may not be available in another pool. The UI may provide instant feedback to the operators by constantly monitoring the resource consumption.

At operation 310 the network resources in already degraded mode may be filtered out due to the current implementation of the feature degradation. At operation 312, the utilization metrics received at operation 302 may be aggregated across homogeneous network resources using aggregator 214. The received utilization metrics of a network resource may be aggregated with a homogeneous group of the network resources that perform similar tasks. The aggregation may be performed across entire pools of network resources to make a determination of whether or not there is an indication of a network deficiency against a pool of the network resources homogenous the network resource in question. Detecting a network deficiency at the network resource level allows to anticipate the network deficiency because excessive resource consumption may often be a precursor to a network deficiency.

At operation 314, the utilization metrics aggregated at 312 may be used by the processing module 216 to determine the aggregate utilization metrics. It will be noted that the system to determine a network deficiency 200 may be agnostic of the mode of collection of the utilization metrics. In some embodiments, the utilization metrics may be monitored and intelligently aggregated. Additionally, intelligent trending and baselining may be utilized to identify when predetermined thresholds are trespassed, wherein the predetermined threshold set may be set manually or determined by the system. Thus, an inadequate capacity to serve client requests in aggregation within proper SLAs (Server Level Agreements) may be detected. Tools for the network deficiency analysis and detection may be provided by enabling an alarm, facilitated by the alarming module 224 when the utilization metrics reach a particular level of degradation and the threshold is surpassed.

For example, a promotional event, such as a free service day, may result in overloading of the site. Such an event may be expected and measures may be taken beforehand. If, however, an event is unexpected, more drastic measures may be employed until the site operators are able to resolve the traffic issues and stabilize the pool of active connections. Some other situations may warrant a long-term action to reduce traffic to the pool of active connections until a capacity analysis is completed and a resolution is reached to stabilize the pool. The feature degradation and the request filtering policies may be enforced in a specific data center or across data centers. Different operating locations of a distributed site may be allowed to query the state of the system independently and execute the feature degradation and request filtering policies on their respective locations.

At operation 316, the display 220 may display the utilization metrics. In order to take action, site operators may constantly request updated utilization metrics. The UI may be provided to monitor the utilization metrics, and a customization of a number of parameters allowed. Users may be allowed to define a custom view in the UI and data that appear in the custom view. The UI may come pre-configured with several pre-existing views. It may show and allow the users to view inconsistencies on a pool of active connections. For example, five out of four hundred machines may have the policy enforcement enabled. The UI may show the state of the policy event table and the pools of active connections that have policy enforcement enabled. Additionally, the UI may show an audit log for the pools of active connections over a time period, live metrics, how long the pools of active connections have been in degraded mode, and how many requests were blocked by request filters. Additionally, the UI may show the pools of active connections flagged by the method 300 to detect a network deficiency, and the pools of active connections in a degraded mode but no longer alarming.

At operation 318, the detecting module 218 may detect a network deficiency, and at decision block 320, the processing module 216 may determine whether or not the network deficiency is detected. If it is determined at decision block 320 by the detecting module 218 that the network deficiency is not detected, no alert is issued to the policy enforcement processors. If, on the contrary, it is determined at decision block 320 by the detecting module 218 that the network deficiency is detected, the method 300 may proceed to alarm the network operators at 322 by the alarming module 224 and to report the detection of a network deficiency to the policy execution processors using the reporting module 226. In some example embodiments, if the network deficiency is detected at operation 318, a report of a live monitoring of the resource consumption may be made available to the policy engine operators at operation 324. A system for intelligent request filtering in response to a network deficiency is described by way of example with reference to FIG. 4.

Figure 4:
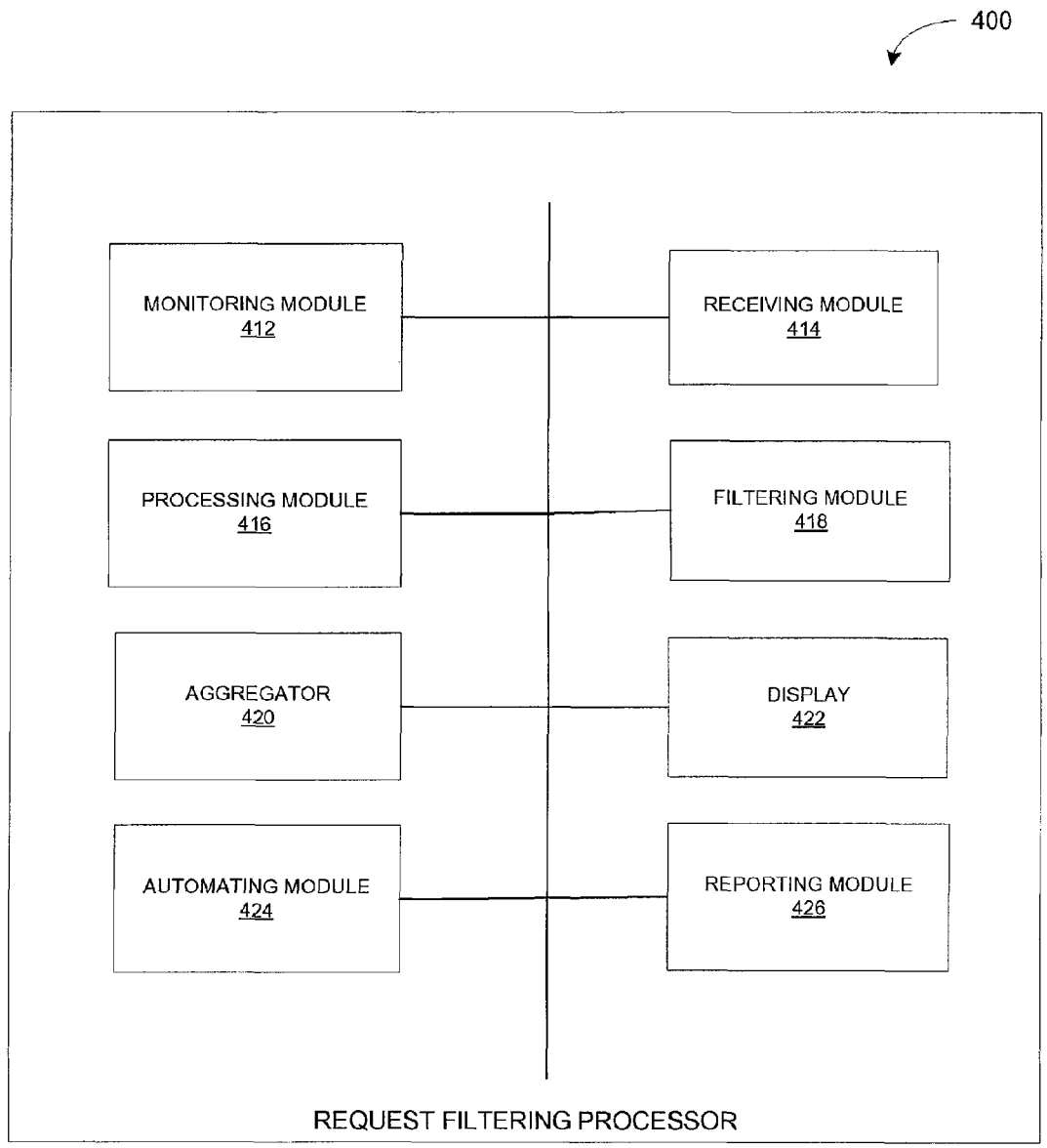
FIG. 4 is a block diagram of a system for intelligent feature degradation in response to a network deficiency, in accordance with an example embodiment.

Referring to FIG. 4 of the drawings, the request filtering processor 400 for intelligent request filtering in response to a network deficiency is shown to include several components that may be configured to perform various operations. The request filtering processor 400 for intelligent request filtering in response to a network deficiency may comprise a monitoring module 412, a receiving module 414, a processing module 416, a filtering module 418, an aggregator 420, a display 422, an automating module 424, and a reporting module 426. The monitoring module 412, in an example embodiment, may be configured to monitor the deficiency detection processor 200 for an indication that a network deficiency is detected, the indication based on the utilization of network resources. If the network deficiency is detected by the deficiency detection processor 200, an alarm may be issued by the alarming module 224 to the request filtering processor 400 and the feature degradation processor 600.

The receiving module 414, in an example embodiment, may be configured to receive the alert issued by the deficiency detection processor 200. The processing module 416, in an example embodiment, may be configured to receive a service request for a network resource from a requesting entity, and to aggregate the revenue generated by the requesting entity with revenue generated by the entities homogeneous to the requesting entity. Additionally, the processing module 416 may determine network resource utilization for the service request and determine the revenue-to-network-resource-utilization ratio based on the revenue generated by the requesting entity and the network utilization. The processing module 416 may also implement the request filtering policy by filtering the response to the service request when the revenue-to-network-resource-utilization ratio is below a second predetermined threshold unless the utilization of the network resources drops below the predetermine threshold.

The filtering module 418, in an example embodiment, may be configured to filter responses to the request for services based on the processing module 416 to implement the request filtering policy. The aggregator 420, in an example embodiment, may be configured to aggregate the requests from homogeneous entities in order to determine the combined effect on resource consumption, the combined revenue, and the cost function of the ratio of the combined revenue to resource consumption.

The display 422, in an example embodiment, may be configured to display the information received and aggregated on a GUI and to allow the operator to implement enforcement policies to alleviate a network deficiency based on the determination that the network deficiency is imminent. The display 422 may be used both for monitoring of the situation and for the control of parameters set for the policy enforcement. Various uses of the GUI are discussed in more detail below. The automating module 424, in an example embodiment, may be configured to automate the process of information gathering and policy enforcement. The automating module 424 may determine whether or not a precursor for to network deficiency is detected and what actions may be taken to implement various policies in response to the detection. The reporting module 426, in an example embodiment, may be configured to report the effect of the enforcement of the request filtering policy back to the policy processors. A report may be made to the policy engine 170, the deficiency detection processor 200, or the feature degradation processor 600. Various operations performed by the system 400 for intelligent request filtering in response to a network deficiency are described by way of example with reference to an example method 500 of FIG. 5.

Figure 5:
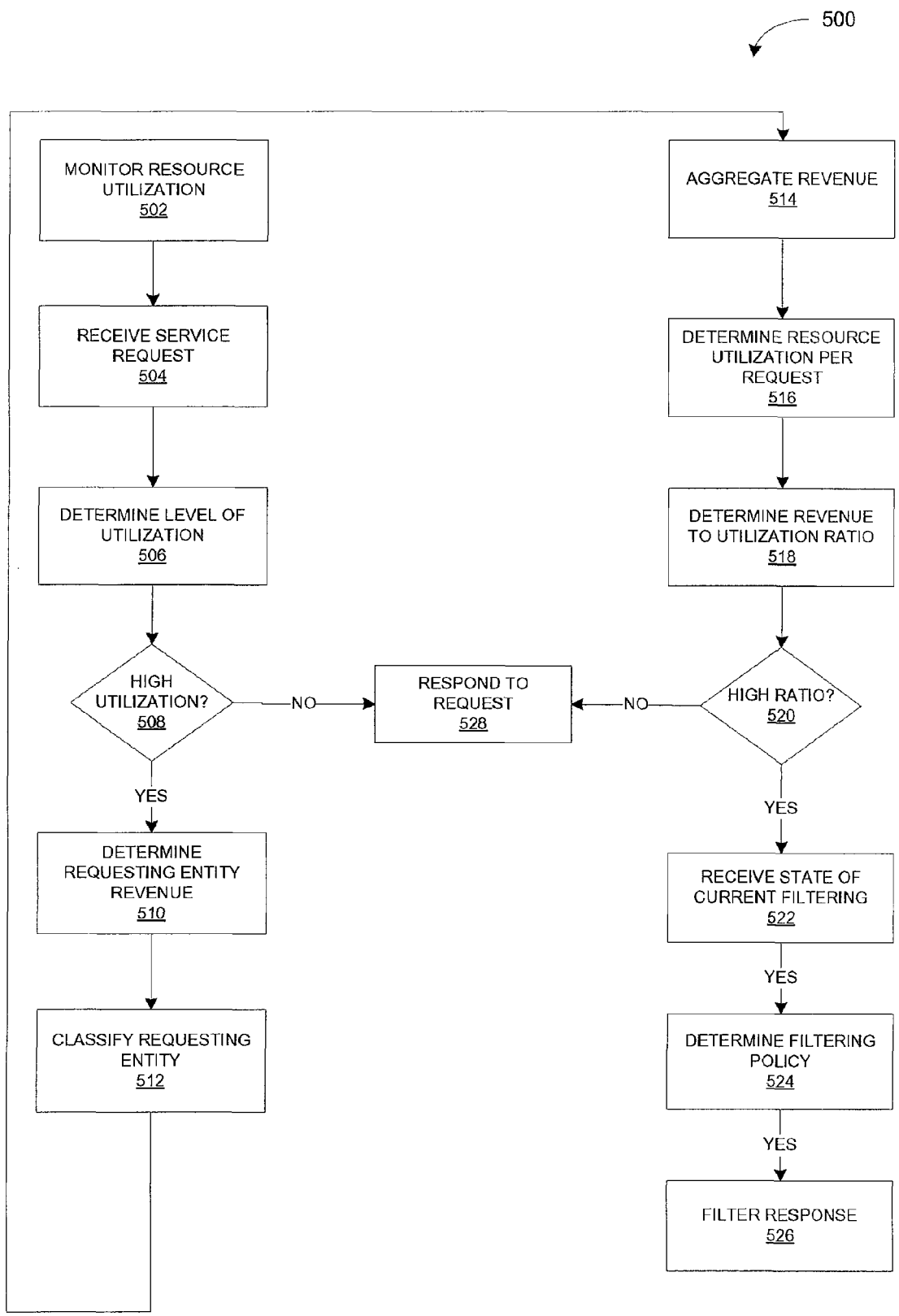
FIG. 5 is a flow chart illustrating a method for intelligent request filtering in response to a network deficiency, in accordance with an example embodiment.

FIG. 5 is a flow chart illustrating a method 500 for intelligent request filtering in response to a network deficiency, according to one example embodiment. The method 500 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the system to detect a network deficiency 400 illustrated in FIG. 4. The method 500 may be performed by the various modules discussed above with reference to FIG. 4. These modules may comprise processing logic.

As shown in FIG. 5, the method 500 commences with the monitoring module 412 monitoring the utilization metrics at operation 502, wherein the utilization metrics are reported by the deficiency detection processor 200. At operation 504, the receiving module 414 may receive a request for service. As a result of implementation of the request filtering policy, a percentage of requests in a pool of active connections may be turned away, based on type of request. The request filtering may be implemented by blocking requests for service. The request filtering can be placed on any tier in the system. The request filtering may be placed before a request enters a web server load balancer 130. The request filtering may be implemented on the application server load balancer 140, data center 150, and at several different tiers. When filtering the request, the processing module 416 may be able to distinguish between using entities such as a user 170 and a BOT 180.

As an example, the processing module 416 may be able to distinguish a regular request from the BOT 180 (web robot) request. The BOT 180 is a software application that runs automated tasks over the Internet. Typically, the BOT 180 performs tasks that are structurally repetitive, at a much higher rate than would be possible for a human editor alone. The largest use of BOTs is in web spidering, in which an automated script fetches, analyses, and files information from web servers at many times the speed of a human. A server may have a file (e.g. robots.txt), containing rules for crawling of that server that the BOT 180 is supposed to obey. Because a BOT used to index an Internet site may perform its tasks at the times the traffic to the site is reduced (e.g., early morning hours) the BOT 180 may be asked to return and crawl the site at a certain time.

At operation 506, the processing module 416 may determine the level of resource utilization, and the method 500 may proceed to decision block 508. At decision block 508, it may be determined using the processing module 416 whether or not the level of utilization is high. If it is determined by the processing module 416 at decision block 508 that the level of utilization is low, the request for service may be responded to with the requested resources at operation 528, and the monitoring may continue using monitoring module 412. If, on the contrary, it is determined at decision block 508 by the processing module 416 that level of utilization is high, the method 500 proceeds to determine, by the processing module 416, the requesting entity revenue at operation 510. At operation 512, the requesting entity may be characterized using the processing module 416.

In some embodiments, the processing module 416 may determine the identity of the using entity by analysing the request. One of the parameters that is included in the request is the user's IP (Internet Protocol). Because IP addresses may be dynamic and a previously used IP address may be reassigned, user's identity may based on a maintained list of users. For example, users may be classified as belonging to gold, silver, and bronze levels, with gold being more expensive and accordingly generating more revenue and bronze generating less revenue. In some embodiments, the visitors may be classified as infrequent visitors, frequent visitors, and power users. Based on the user characterization provided by the processing module 416, there may be different degrees of features made available to users. For example, while infrequent users may make up 40% of the traffic, they may contribute 2% to the revenue. Accordingly, the less frequent users may be first to be affected by the feature degradation and request filtering policies because they generate little revenue.

In some embodiments, the processing module 416 may analyze visitors vis-á-vis features, and the feature degradation enforced by eliminating the rarely used features. For example, there may be features that more frequent visitors rarely use. Those features can be degraded during the implementation of the feature degradation policy. In some embodiments, user may be classified as currently signed into a site or as users that remain non-signed. In some embodiments, it may determined that a user is currently in the signed-in session. As an example, if a user is in the middle of a commercial transaction, the user may be allowed to proceed without enforcing the feature degradation or the request filtering and to complete the transaction. Accordingly, users starting new workflows may be blocked before users who are currently in a workflow. In some embodiments, if the user is a seller, higher priority will be given to the features that are seller-oriented. Thus, user roles may be differentiated, whether they are in a workflow, whether they are signed-in or not signed-in, and how valuable each visitor is in terms of revenue generation.

The processing module 416 may place a cookie on the user's client system when the user signs in and during the user's session. When the user signs in again, the cookies placed on the user's system may be looked at for user characterization. In some embodiments, the cookie may be looked at when a policy enforcement decision is made. The types of cookies placed onto the user's system may vary and, in some embodiments, the cookie may be used for an initial categorization. As an example, if an initially characterized user starts to engage in more commercial transactions, another cookie may be placed onto the user's system. In some embodiments, a cookie may be used to keep track of how fresh the current session is. Thus, because a new activity is conducted, data collection may be done, information may be gathered for the generated revenue, and based on the information gathered, a classification may be done and used by a policy enforcement determination.

In some embodiments, a batch job may be utilized to run after hours and update the database with information pertaining to users' activities. When a user logs into a site, a cookie may be placed at the user's client machine based on the database data. The total user profile may be based on the user history on the site and the characterization assigned to the user by the processing module 416. At operation 514, the revenue may be aggregated using the aggregator 420. At operation 516, the processing module 416 may determine resource utilization per request. At operation 518, the processing module 416 may determine a revenue-to-utilization ratio. Thus, spikes in resource utilization may be handled appropriately while maximizing revenue-to-resource utilization ratio. At decision block 520 it may be determined whether or not the ratio is high using the processing module 416. If it is determined at decision block 520 that the ratio is low, the processing module 416 may respond to request at operation 528 and continue monitoring using the monitoring module 412. If, on the contrary, it is determined at decision block 520 by the processing module 416 that the ratio is high, the processing module 416 may not respond to the request, and will proceed to receive the state of the current filtering at operation 522 using the filtering module 418.

At operation 524, the processing module 416 may determine a filtering policy and proceed to block the response to the request for service using filtering module 418 at operation 526. It will be appreciated that the filtering policy may be enforced through the data centers, which are inter-connected to handle implementation over distributed systems. A system for feature degradation in response to a network deficiency is described by way of example with reference to FIG. 6.

Figure 6:
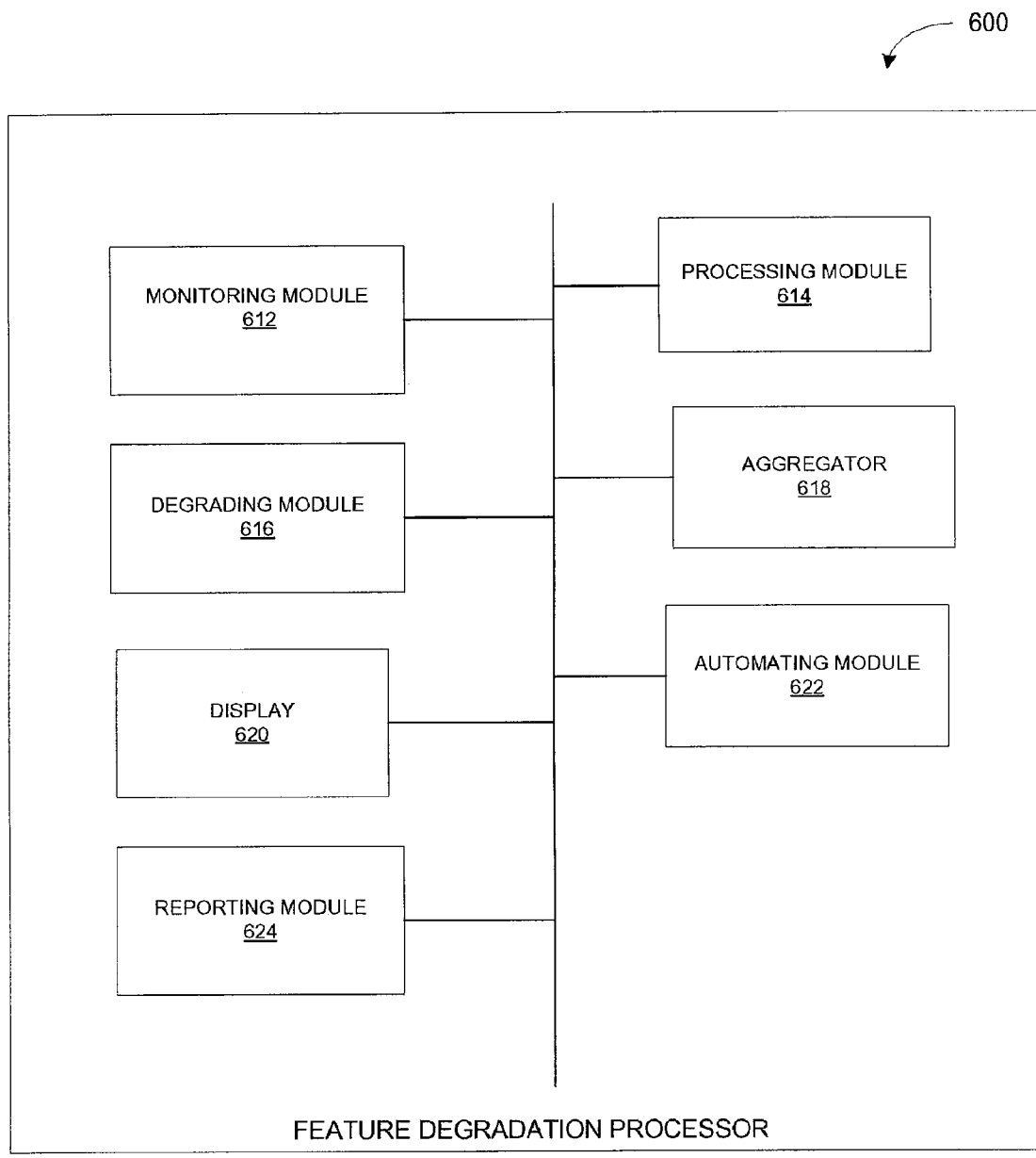
FIG. 6 is a block diagram of a system for intelligent request filtering in response to a network deficiency, in accordance with an example embodiment.

Referring to FIG. 6 of the drawings, the feature degradation processor 600 for feature degradation in response to a network deficiency is shown to include several components that may be configured to perform various operations. The feature degradation processor 600 may comprise a monitoring module 612, a processing module 614, a degrading module 616, an aggregator 618, a display 620, an automating module 622, and a reporting module 624.

The monitoring module 612, in an example embodiment, may be configured to monitor the deficiency detection processor 200 for an indication that a network deficiency is detected, the indication based on the utilization of network resources. If the network deficiency is detected by the deficiency detection processor 200, an alert may be issued to the request filtering processor 400 and the feature degradation processor 600. The monitoring module 612, in an example embodiment, may be configured to receive the alert issued by the deficiency detection processor 200. The processing module 614 may determine whether the utilization of the network resource is above a predetermined threshold, determine the category of the using entity, and determine the revenue generated by using entity. Additionally, the processing module 614 may degrade application-level features available to the using entity unless the utilization of the network resources drops below the predetermined threshold.

The degrading module 616, in an example embodiment, may be configured to degrade the application-level features based on the determination, by processing module 614, that the features may be degraded. The aggregator 618, in an example embodiment, may be configured to aggregate the using entity with the homogeneous using entities. The display 620, in an example embodiment, may be configured to display the information received and aggregated on a GUI and to allow the operator to implement enforcement policies to alleviate a network deficiency based on the determination that the network deficiency is imminent. The display 620 may be used both for monitoring the situation and for the control of parameters set for the policy enforcement. Various uses of the GUI are discussed in more detail below.

The automating module 622, in an example embodiment, may be configured to automate the process of the information gathering and policy enforcement. Using the automation module 622, it may be determined whether or not a precursor to network deficiency is detected and what actions may be taken to implement various policies in response to the detection. The reporting module 624, in an example embodiment, may be configured to report back to the policy processors an effect of the enforcement of the request filtering policy. A report may be made to the policy engine 170, the deficiency detection processor 200, or the request filtering processor 400. Various operations performed by the system 600 for feature degradation in response to a network deficiency are described by way of example with reference to an example method 700 of FIG. 7.

Figure 7:
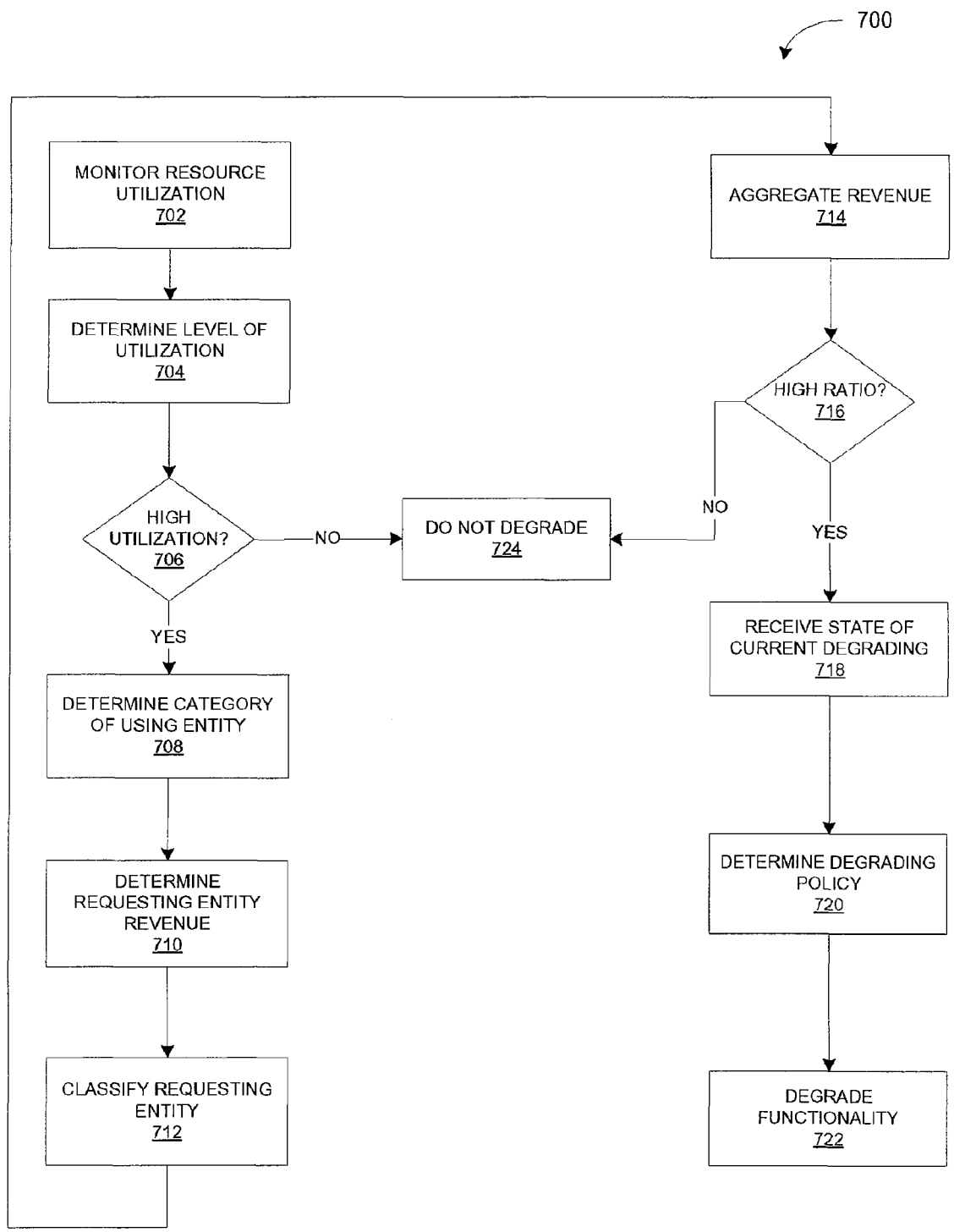
FIG. 7 is a flow chart illustrating a method for intelligent feature degradation in response to a network deficiency, in accordance with an example embodiment.

FIG. 7 is a flow chart illustrating a method 700 for intelligent feature degradation in response to a network deficiency, according to one example embodiment. The method 700 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the system 600 illustrated in FIG. 6. The method 700 may be performed by the various modules discussed above with reference to FIG. 6. These modules may comprise processing logic.

As shown in FIG. 7, the method 700 may commence with the monitoring module 612 monitoring the utilization metrics at operation 702 by receiving the utilization metrics updates from the deficiency detection processor 200. It will be appreciated that with reference to the feature degradation policy, the feature degradation processor 600 may decide what triggers the decision to go into the degraded mode and when to return back to normal mode again based on the monitoring of resource consumption at operation 702. Once it is determined that the feature degradation processor 600 may go into the degraded mode, the feature degradation processor 600 may weigh the benefits and costs of different options and may also consider how the policy implementation is beneficial over the short term, mid-term, and long-term periods. The feature degradation processor 600 may also decide where to implement the policy (e.g., web gateway level, application server level, API (Application Programming Interface) gateway level). Thereafter, the feature degradation processor 600 may determine a level of degradation and response filtering to maximize the revenue.

At operation 704, the processing module 614 may determine the level of the resource utilization. According to the method 700, the feature degradation policy may be enforced at the application level by degrading features available to the users and by eliminating some features of the displayed page.

Figure 9:
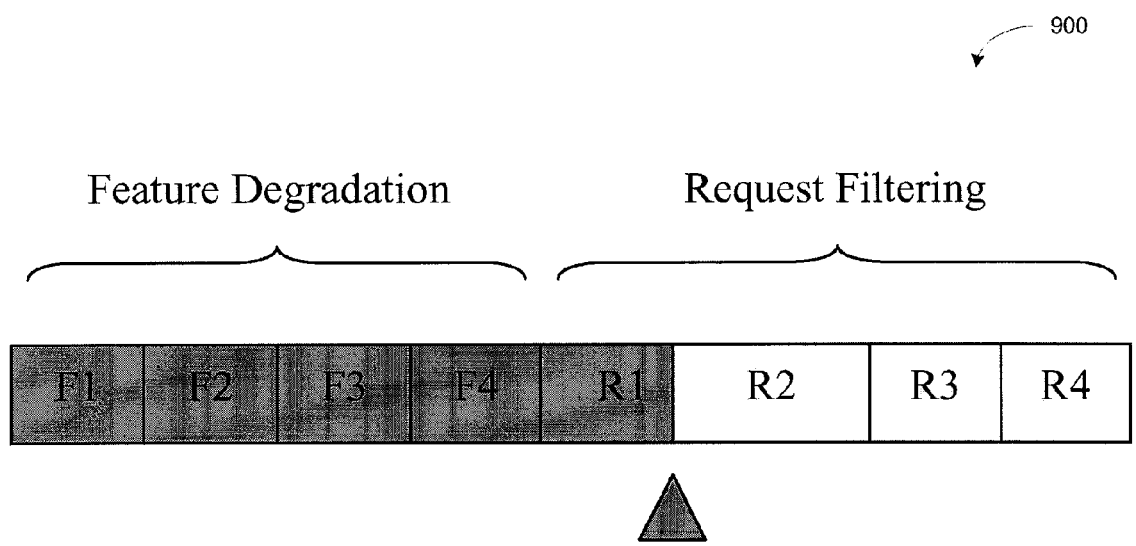
FIG. 9 is a block diagram of a sliding scale used in application of a method for intelligent request filtering and a method for intelligent feature degradation, in accordance with an example embodiment.

The implementation of the feature degradation may be performed in conjunction with the request filtering as illustrated by the sliding scale 900 with reference to FIG. 9. As an example, the processing module 614 may escalate the level of degradation, watch for traffic, and calculate the effect of the degradation. If the effect is not satisfactory to alleviate the network deficiency, the request filtering may be implemented, escalating the enforcement to affect more and more users. An automation may be implemented by having an engine located inside or outside the network receive the gathered data, determine the level of the policy enforcement, and start the feature degradation and the request filtering.

At decision block 706, the processing module 614 may determine whether or not the resource utilization is above a predetermined threshold. If it is determined at decision block 706 that the utilization is below the predetermined threshold, the method 700 may proceed to operation 724 without degrading the application features. The method 700 may continue monitoring the resource utilization using the monitoring module 612. If, on the contrary, it is determined at decision block 706 that utilization is above the predetermined threshold, the method 700 may proceed to determine the category of the using entity at operation 708 using the processing module 614. At operation 710, the processing module 614 may determine the requesting entity revenue generation.

The feature degradation processing module 600, when enabled, may allow the request to pass through but with a limited number of features. There may be different levels of feature degradation available to the site operators (e.g., 1-4) As an example, 1 may be least restrictive and 4 may be the most restrictive feature degradation enforcement. Application developers may be provided with a GUI available for view on the display 620 to register the features they want to allow or disallow when this policy is enforced. In some embodiments, the connection pool owners may choose to implement different levels of feature degradation on their respective pools of active connections and reduce current features on the pool of active connections. This feature degradation may allow the requests to flow through the application server, but the URL may carry a lighter weight with an increased throughput. Because of its lighter effect on the users, the feature degradation may be enforced before the request filtering is enforced to allow features be degraded before turning requests away.

At operation 712, the processing module 614 may characterize the requesting entity. The processing module 614 may implement a reduction of components on a web page. For example, to show ten components on a page may take less computing power than generation of 100 components. Some components generated on the page may involve more computational resources and Internet traffic bandwidth but do not necessarily generate significant revenue. So a user characterized at a certain predetermined level may be shown certain limited number of features. Thus, the page may still be shown, but the page shown will be one that is cheaper and lighter without losing the content. The features that generate little revenue may be tracked and then automatically degraded. Accordingly, the feature degradation and the request filtering may involve two variables, revenue and resource. A better indicator to determine which feature to degrade or which request to filter may be a ratio of revenue divided by the computing power required to process the request.

The feature degradation may be specific to a pool of active connections, so pools may decide their own features to be degraded as some features may be more valuable to some pools. In some embodiments, the framework of the feature degradation may be pluggable, and the domain owners may plug in their own solutions for the feature degradation. Thus, a pool may designate a set of features corresponding to different levels of users that are to be degraded, depending on how the features were rated by the domain owners in terms of the features' revenue generation. When the feature degradation is turned on, the features may be degraded based on their rating. In some embodiments, the site may declare the features, the capacity, and when the features are to be degraded, for example by 30%, it may be determined which features to be degraded according to the declared features and the capacity.

At operation 714, the aggregator 618 may aggregate the revenue in a manner of aggregation discussed above with reference to the method 500. At decision block 716, the processing module 614 may determine whether or not the revenue-to-resource utilization ratio is above a predetermined threshold. If it is determined at decision block 716 that the ratio is below the predetermined threshold, no feature degradation may be performed at operation 724, and the monitoring may continue using the monitoring module 612. If, on the contrary, it is determined by the monitoring module 612 at decision block 716 that the ratio is above the predetermined threshold, the method 700 may proceed to receive the state of the current degrading at operation 718 using the monitoring module 612. At operation 720, the processing module 614 determines the degradation policy.

Figure 8:
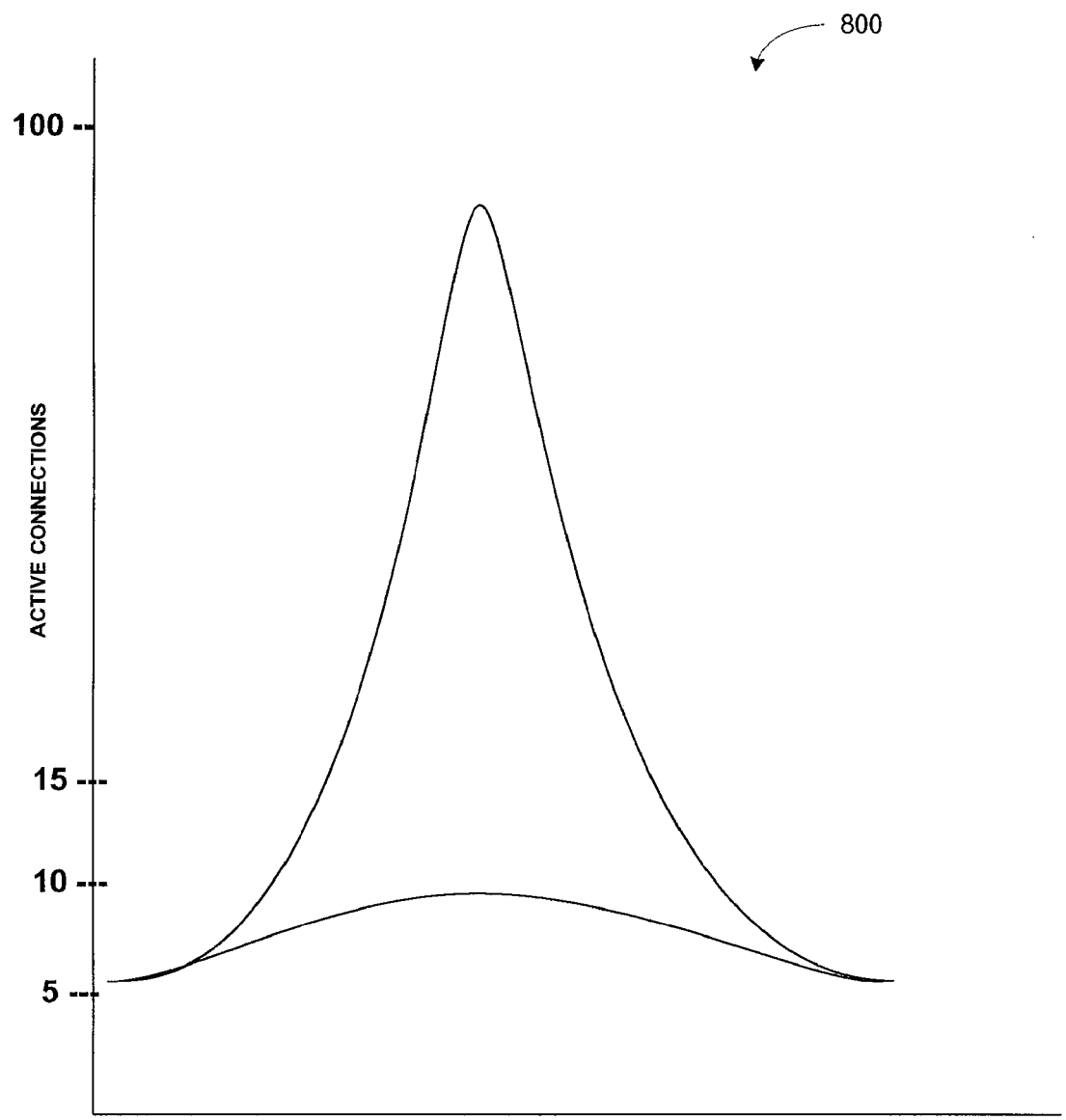
FIG. 8 is a graph illustrating an effect of applying of a method for intelligent request filtering and a method for intelligent feature degradation to active connections, in accordance with an example embodiment.

In some embodiments, a response-satisfying request may not be filtered because no filtering policy applies at the time, so the request is allowed to pass through. Even if the response is not filtered, if the feature degradation policy is enabled it may allow some limited features at the application tier. Thus, at operation 722 the degrading module may degrade the application-level features notwithstanding the enforcement of the filtering policy. In some example embodiments, because the feature degradation policy may affect the user interface features, the feature degradation policy may be executed on the application server tier. FIG. 8 is a graph illustrating an effect of applying a method for intelligent request filtering 500 and a method for intelligent feature degradation on active connections 700, in accordance with an example embodiment.

The graph 800 in FIG. 8 illustrates, by a way of example, active threads in a pool of active connections. There may be service requests coming into a number of application servers. The application servers may have a pool of threads where multiple threads are idle and waiting for an incoming request. As an example, a server may have a maximum of ten threads. When the thread pool reaches the maximum number of threads, it may not serve any more requests. Thus, for example, if there are 600 servers, 6000 requests can be handled per second, concurrently. With the number of service requests increasing, the number of utilized connections may approach the maximum. At this point, the feature degradation and request filters policies may be turned on and will start turning off features and turning away requests. It may be determined by the processing module 614 that a network deficiency is caused, as an example, by low database, a bug in an application server, a free listing day, or the pool of active connections reaching its capacity. The feature degradation and the request filtering policies may allow the pool of active connections to recover sooner and serve faster without affecting users who generate larger revenues to continue uninterrupted.

FIG. 9 is a block diagram of a sliding scale 900 used in application of the method for intelligent request filtering 500 and the method for intelligent feature degradation 700. Both request filtering and feature degradation policies may be enforced using the slider shown in the FIG. 9 by way of example. The feature degradation policy is shown by F1 . . . F4 and the request filtering is shown by R1 . . . R4. As an example, a "tool tip" may be provided suggested level of degradation. By moving the tool tip of the sliding scale 900 the operator may control the level of the enforcement of the feature degradation and the request filtering. In some embodiments, the sliding scale 900 implementation of the request filtering and feature degradation policies may be automated. As shown in FIG. 9, the request filtering may be enabled after feature degradation. The width of steps in the sliding scale 900 is not illustrated to scale. For example, the width of R2 appears larger than R1. This may not mean that R2 will turn away more requests than R1. In some embodiments, the "tool tip" may be moved using the GUI to provide the feature degradation or the request filtering enforcement as a percentage of total requests sampled. The feature degradation and the request filtering may be provided by sampling requests on the pool of active connections and may be different from one pool to another.

Figure 10:
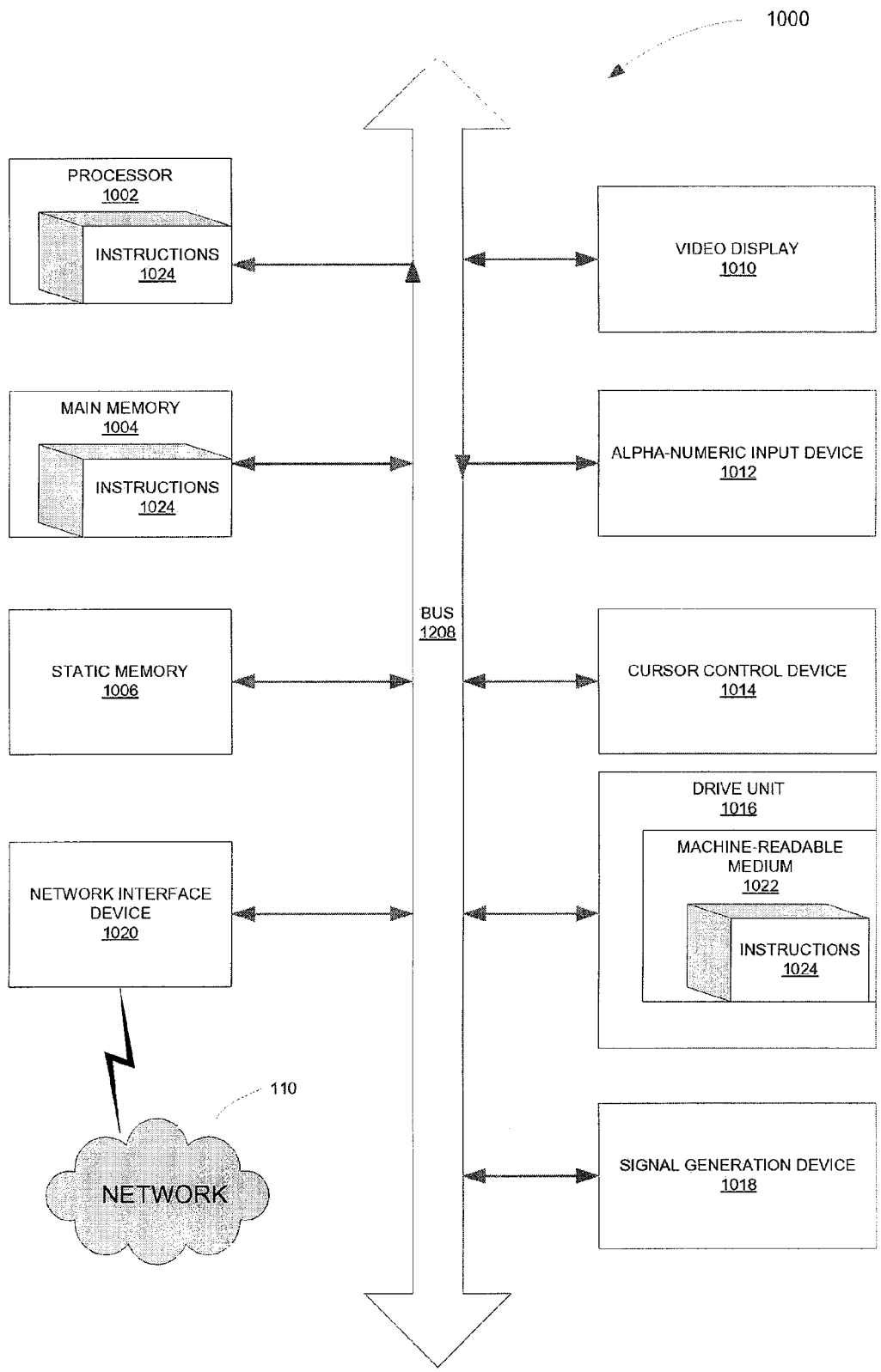
FIG. 10 illustrates a diagrammatic representation of a machine in the example form of a computer system within which a set of instructions for causing the machine to perform any one or more of the methodologies discussed herein may be executed.

FIG. 10 illustrates an example computer system, according to one example embodiment. The example computer system 1000 includes a processor 1002 (e.g., a central processing unit (CPU), a graphics processing unit (GPU) or both), a main memory 1004, and a static memory 1006, which communicate via a bus 1208. The computer system 1000 may further include a video display unit 1010 (e.g., a liquid crystal display (LCD) or a cathode ray tube (CRT)). The computer system 1000 may also include an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions and data structures (e.g., instructions 1024) embodying or utilized by any one or more of the methodologies or features described herein. The instructions 1024 may also reside, completely or at least partially, within the main memory 1004 and within the processor 1002 during execution thereof by the computer system 1000, the main memory 1004 and the processor 1002 also constituting machine-readable media.

The instructions 1024 may further be transmitted or received over a network 110 via the network interface device 1020 utilizing any one of a number of transfer protocols (e.g., HTTP).

While the machine-readable medium 1022 is shown in an example embodiment to be a single medium, the term "machine-readable medium" should be taken to include a single medium or multiple media (e.g., a centralized or distributed database, and associated caches and servers) that store the one or more sets of instructions. The term "machine-readable medium" may be taken to include any medium that is capable of storing, encoding, or carrying a set of instructions for execution by the machine and that cause the machine to perform any one or more of the methodologies of the present application, or that is capable of storing, encoding, or carrying data structures utilized by or associated with such a set of instructions. The term "machine-readable medium" may be taken to include, but not be limited to, solid-state memories, optical and magnetic media, and carrier wave signals. Such media may also include hard disks, floppy disks, flash memory cards, digital video disks, random access memory (RAMs), read only memory (ROMs), and the like.

The embodiments described herein may be implemented in an operating environment comprising software installed on a computer, hardware, or a combination of software and hardware.

Thus, a method and system to detect a network deficiency have been described. Although embodiments have been described with reference to specific example embodiments, it will be evident that various modifications and changes may be made to these embodiments without departing from the broader spirit and scope of the present application. Accordingly, the specification and drawings are to be regarded in an illustrative rather than a restrictive sense.

The invention claimed is:

1. A method comprising:
monitoring utilization metrics of a plurality of network resources;
determining whether utilization of the plurality of the network resources is above a threshold;
determining a category of an application-level using entity;
determining a revenue generated by the application-level using entity;
aggregating the revenue generated by the application-level using entity with additional revenues generated by application-level using entities homogenous to the application-level using entity; and
degrading at least one application-level feature available to the application-level using entity based on the category and the revenue generated by the application-level using entity unless the utilization of the plurality of the network resources drops below the threshold, the degrading including making the at least one application-level feature unavailable to the application-level using entity.

2. The method of claim 1, wherein the degrading of the at least one application-level feature available to the application-level using entity is based on the aggregated revenues.

3. The method of claim 1, further comprising determining whether utilization of the plurality of the network resources above the threshold is in response to a planned resource intensive event.

4. The method of claim 1, wherein the degrading of the at least one application-level feature is based on factors comprising a frequency of use, a transaction volume, and a transaction role of the application-level using entity.

5. The method of claim 1, further comprising displaying a user interface to support an enablement and a disablement of the at least one application-level feature when the degrading is enforced through a localized customizable configuration.

6. The method of claim 1, further comprising displaying a user interface to support an enablement and a disablement of the at least one application-level feature when the degrading is enforced through a centralized customizable configuration.

7. The method of claim 1, further comprising automating of the degrading of the at least one application-level feature available to the application-level using entity based on the category of the application-level using entity and the revenue generated by the application-level using entity unless the utilization of the plurality of the network resources drops below the threshold.

8. The method of claim 1, further comprising reporting a workflow state of the degrading of the application-level feature for pools of active connections, wherein the pools of active connections are flagged as no longer alarming.

9. The method of claim 1, wherein the degrading of the application-level feature is performed on a percentage of the network resources.

10. A system comprising:
a monitoring module to monitor utilization metrics of a plurality of network resources;
a processing module to determine whether utilization of the plurality of the network resources is above a threshold, to determine a category of an application-level using entity, and to determine a revenue generated by the application-level using entity;
an aggregator to aggregate the revenue generated by the application-level using entity with additional revenues generated by application-level using entities homogenous to the application-level using entity; and
a degrading module, having one or more processors, to degrade at least one application-level feature available to the application-level using entity based on the category and the revenue generated by the application-level using entity unless the utilization of the plurality of the network resources drops below the threshold, the degrading including making the at least one application-level feature unavailable to the application-level using entity.

11. The system of claim 10, wherein the degrading module is to degrade the at least one application-level feature available to the application-level using entity based on the aggregated revenues.

12. The system of claim 10, wherein the processing module is to determine whether utilization of the plurality of the network resources above the threshold is in response to a planned resource intensive event.

13. The system of claim 10, wherein the degrading module is to degrade the application-level feature based on factors comprising a frequency of use, a transaction volume, and a transaction role of the application-level using entity.

14. The system of claim 10, further comprising a display to display a user interface to support an enablement and a disablement of the at least one application-level feature when the degrading is enforced through a localized customizable configuration.

15. The system of claim 10, further comprising a display to display a user interface to support an enablement and a disablement of the application-level feature when the degrading is enforced through a centralized customizable configuration.

16. The system of claim 10, further comprising an automating module to automate the degrading of the application-level feature available to the application-level using entity based on the category of the application-level using entity and the revenue generated by the application-level using entity unless the utilization of the plurality of the network resources drops below the threshold.

17. The system of claim 10, further comprising a reporting module to report a workflow state of the degrading of the application-level feature for pools of active connections, wherein the pools of active connections are flagged as no longer alarming.

18. The system of claim 10, wherein the degrading module is to degrade the application-level feature based on a percentage of the network resources.

19. A non-transitory machine-readable medium comprising instructions, which when implemented by one or more processors, perform operations comprising:
   monitoring utilization metrics of a plurality of network resources;
   determining whether utilization of the plurality of the network resources is above a threshold;
   determining a category of an application-level using entity;
   determining a revenue generated by the application-level using entity;
   aggregating the revenue generated by the application-level using entity with additional revenues generated by application-level using entities homogenous to the application-level using entity; and
   degrading at least one application-level feature available to the application-level using entity based on the category and the revenue generated by the application-level using entity unless the utilization of the plurality of the network resources drops below the threshold, the degrading including making the at least one application-level feature unavailable to the application-level using entity.

20. An apparatus comprising:
means for monitoring utilization metrics of a plurality of network resources;
means for determining whether utilization of the plurality of the network resources is above a threshold;
means for determining a category of an application-level using entity;
means for determining a revenue generated by the application-level using entity;
means for aggregating the revenue generated by the application-level using entity with additional revenues generated by application-level using entities homogenous to the application-level using entity; and
means for degrading at least one application-level feature available to the application-level using entity based on the category and the revenue generated by the application-level using entity unless the utilization of the plurality of the network resources drops below the threshold, the degrading including making the at least one application-level feature unavailable to the application-level using entity.

* * * * *